Figure 1:
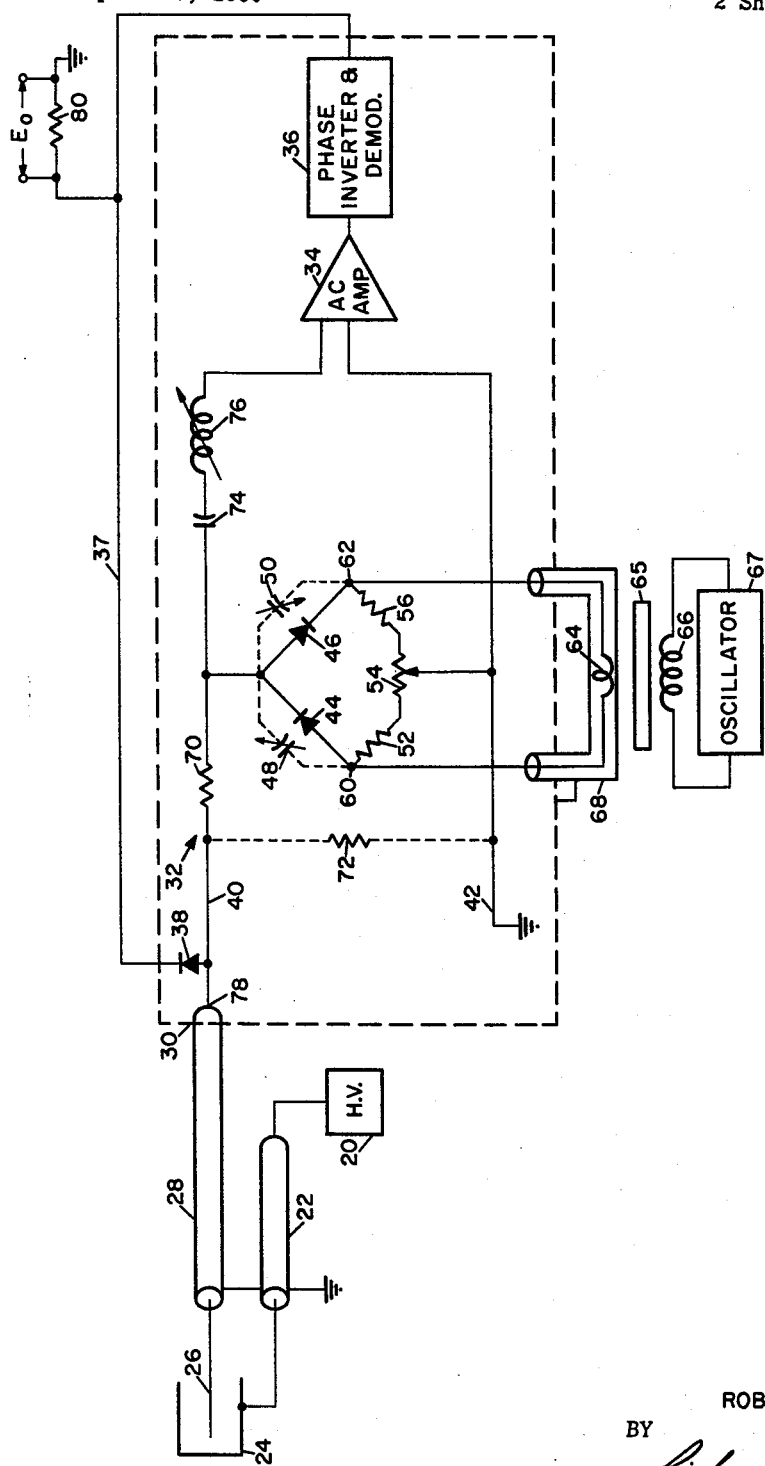

INVENTOR.
ROBERT R. HOGE

United States Patent Office 3,073,956
Patented Jan. 15, 1963

3,073,956
NUCLEAR INSTRUMENTATION
Robert R. Hoge, Farmington, Mich., assignor to The Bendix Corporation, a corporation of Delaware
Filed Apr. 30, 1959, Ser. No. 809,960
12 Claims. (Cl. 250—83.1)

This invention pertains to nuclear instrumentation wherein a signal from an ionization chamber which establishes a current in response to neutron bombardment is greatly amplified, and the method of amplifying said signal.

It is an essential object of this invention to provide a nuclear instrumentation which receives a very small signal from an ionization chamber and accurately amplifies this signal with the tolerances of the instrumentation components being large and the instrumentation controls being simplified.

It is another object of this invention to provide in such instrumentation, a bridge circuit having a pair of adjacent connected arms each of which has a semiconductive device acting as voltage variable capacitors placed therein in a common direction, and with these arms connected to a pair of resistive arms which are connected to each other through a rheostat slide wire, and with a high frequency alternating current source being between the semiconductive half of the bridge circuit and the resistive half of the bridge circuit; a rheostat contact slidable along the rheostat wire between the resistive arms so that the bridge may be balanced by movement of the contact along the rheostat wire, whereby the application of an input signal at a point between the semiconductive devices will bias these devices, changing their capacitance, to unbalance the bridge, thereby providing an amplified output signal corresponding to the unbalance resulting therefrom.

It is a further object of this invention to provide in such a bridge a conductive enclosure for the bridge components to shield them from the high frequency alternating current source which comprises a shielded coaxial cable connected across the semiconductive arms and extending through the enclosure, the coaxial cable being wound as a secondary about a transformer core located outside the conductive enclosure, and with the transformer core having a primary winding connected to an oscillator device.

It is a further object to connect to such a bridge in the above instrumentation system an amplifier, a phase inverter, a demodulator, and a feedback or shunt circuit which comprises a diode connection between the output of the demodulator and the input to the bridge circuit which converts the output voltage to a logarithmic function of the input current.

It is a further object to provide an inverter bridge having in one half two semiconductor arms with each arm having a semiconductor device acting as voltage variable capacitors connected in a common direction, and in the other half two resistive arms, with the diagonal between the semiconductive and resistive arms including a high frequency alternating current source, and with a rheostat wire connection connecting the two resistive arms so that movement of a rheostat pointer will balance the output of the bridge and application of a direct current input signal between semiconductive devices will bias the semiconductive devices, changing their capacitances and unbalancing the bridge resulting in an alternating output corresponding to the unbalance.

It is a further object to provide in the bridge circuit of the previous paragraph a high frequency alternating current source comprising a transformer core with the secondary winding connected along the aforementioned diagonal and the primary winding connected to an oscillator; the bridge components having a shield or conductive enclosure therearound with the secondary winding leads extending through the conductive enclosure and with the extended portion of the secondary winding being shielded by an outer conductor connected to the bridge shield and with the transformer core, primary winding, and oscillator being without the conductive enclosure.

It is a still further object to provide a method of amplifying small electrical signals comprising the steps of feeding said signal between a pair of semiconductor devices, applying a level of alternating voltage across the semiconductor devices below the conduction level of the devices, amplifying, phase inverting, and rectifying the output across the semiconductor devices, and applying through a logarithmic device the rectified output between the semiconductor devices.

Figure 2:
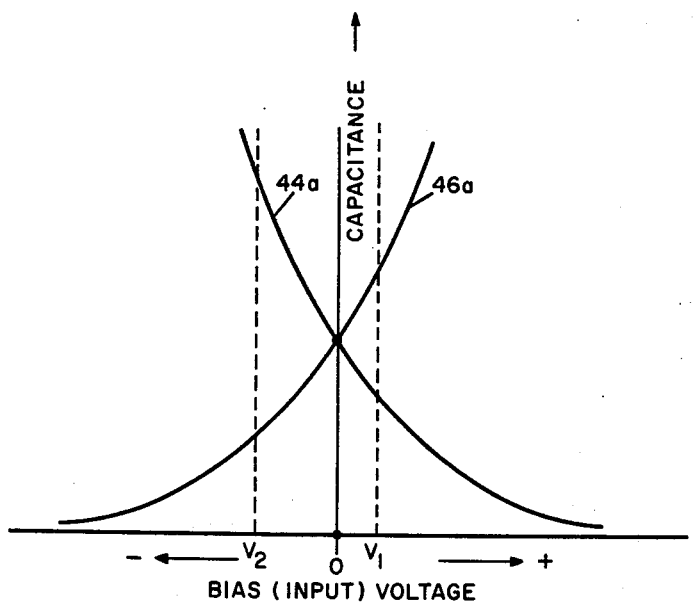

These and other objects will become more apparent when a preferred embodiment of this invention is described in connection with the drawings in which:

FIGURE 1 is a block schematic diagram of a nuclear reactor instrumentation system; and FIGURE 2 is a plot of the capacitances of the semiconductive devices as they vary with bias voltage.

This invention pertains to instrumentation for amplifying very small currents to usable currents and has the advantages of low power requirements, mechanical and electrical stability, long life, simplicity of adjustment, low initial and maintenance costs, and accuracy of amplification. This invention provides an instrumentation system wherein a semiconductive bridge circuit is used to invert a small direct current to an amplified alternating current which is further amplified, phase inverted, and then rectified to a direct current. The bridge portions are effectively shielded and a "feedback" or shunt circuit is provided to stabilize the instrumentation action resulting in highly accurate performance.

The bridge comprises two semiconductive devices acting as voltage variable capacitors connected in a common direction in adjacent arms of a bridge circuit. A high frequency oscillator source is connected across the arms and a rheostat means is also connected across the arms with the rheostat pointer being connected to the output. Moving the pointer until the output is zero provides a simple balancing means and bridge component characteristics can be easily balanced out.

The current output of an ionization chamber is connected between the semiconductive devices and biases one semiconductive device in a forward direction and the other semiconductive device in a reverse direction to oppositely affect their capacitances which unbalances the bridge circuit resulting in an amplified alternating output corresponding to the unbalance. Inputs as low as $10^{-10}$ amperes are sufficient to unbalance the circuit to get a corresponding output which can be amplified as high as twentyfold without the use of a separate amplifier. The inverter bridge is connected to an amplifier which may amplify in the order of 1000 times and then to a phase inverter, the output of which is connected through a diode back to the input to stabilize the amplification of the instrument.

Referring now to the drawings and particularly FIGURE 1, a block schematic diagram of an instrumentation system of this invention is seen. A high voltage source 20 is connected through a shielded cable 22 to the outer surface of ionization chamber 24. A chamber electrode 26 extend from within the chamber 24 through a shielded cable 28 and a conductive enclosure 30 to inverter bridge 32. Enclosure 30, while represented by a dashed line, is continuous in nature and completely encloses the elements indicated therein. The material used for enclosure 30 may be brass or any other suitable shielding material. Bridge 32 is connected to amplifier 34 which in turn is connected to phase inverter and demodulator 36. A feedback line 37 from the output of phase inverter and demodulator 36 to the input of bridge 32 contains a diode 38 therein. Of course, more than one diode may be used and in addition, as later explained, other type electrical components could serve in its place for particular purposes.

The bridge circuit 32 comprises a pair of lines 40, 42 between which are a pair of connected semiconductive devices 44, 46 about which are shown in dashed lines variable capacitors 48, 50, respectively. As will become evident, the semiconductive devices 44, 46 act as variable condensers in the bridge circuit, with the capacity of the condensers varying according to the input voltage applied to the devices 44, 46. Semiconductors manufactured by Hughes Aircraft Company and having a product number HC–7005 and manufactured by Pacific Semiconductor, Inc. with product number V–100 have been successfully used in the circuit. It is desirable to use a semiconductor which has a high rate of capacitive change per increment of bias or input voltage to provide the desired sensitivity. Also, the semiconductors should be chosen to have very small leakage current.

The lower half of the bridge circuit comprises resistances 52, 54, 56 with resistance or rheostat 54 having an adjustable contact connected to line 42. The values of the resistances 52, 54, 56 may be respectively 300, 100 and 300 ohms.

A high frequency oscillating source is connected across the semiconductive and resistive portions of the bridge circuit. Connected between points 60 and 62 of the bridge circuit is a secondary winding 64 which extends through the conductive enclosure 30 and is wound about a transformer core 65. Those portions of the secondary winding outside of the enclosure 30 are shielded by an outer cable 68 which is connected to the enclosure 30. The transformer core 65 is energized by primary 66, which is connected across oscillating source 67, which may generate a square, sinusoidal or other periodic wave. The frequency of the voltage impressed at points 60 and 62 may be for a particular application approximately 10 kilocycles and it has been found that advantageous operation is obtained when the operating root mean square voltage between points 60 and 62 is between 100 and 200 millivolts with very satisfactory operation occurring at 150 millivolts.

Further elements of the bridge circuit include resistance 70 which may be 750 kilohms and which is used to isolate the output from the input. A resistance 72 shunting the bridge represents the leakage resistance of the semiconductors 44, 46 and is for the semiconductors mentioned approixmately $10^{10}$ ohms. Also located in line 40 is a blocking condenser 74 which blocks the direct current input from the alternating current output going to amplifier 34. Inductance 76 is adjusted so that the capacitive effects of the bridge as seen by amplifier 34 are substantially reduced.

The operation of the bridge circuit will be more easily understood with reference to FIGURE 2 which shows a pair of curves 44a and 46a representing the plots of capacitance, measured along the ordinate, of semiconductors 44, 46, respectively, versus the bias or input voltage masured along the abscissa.

The first step in the operation of the circuit is to adjust potentiometer 54 until the bridge output is balanced or zero. With this single adjustment the bridge output is balanced and any irregularities in the circuit components or semiconductors are balanced. Because of this balancing, the circuit components and assembly costs are reduced and simplified since tolerances may be correspondingly large. If an input current, as from ionization chamber 24, is inserted at point 78 in line 40 in a positive direction, semiconductor 44 will be biased in a reverse direction and semiconductor 46 will be biased in a forward direction. Assuming the input voltage to be $V_1$, reference to FIGURE 2 will show that the capacitances of the semiconductors will assume new values unbalancing the bridge circuit. Each different value of the input voltage will result in different capacitive values of the semiconductors 44, 46 as determined by the curves 44a, 46a, respectively. This unbalance will result in a corresponding alternating output of the bridge circuit to amplifier 34 and with the embodiment shown, amplification may be up to 20 times. If a minus input, such as $V_2$, is inserted at point 78, then a phase reversal will occur at the bridge output with the absolute value of the input corresponding to the amplitude of the alternating current output.

The amplifier 34 amplifies the signal as desired, which may be 1000 times, and passes the amplified signal to a phase inverter 36 which rectifies and inverts all voltages going thereto 180°, reversing their sign. This amplified, reversed voltage is applied at one terminal of a semiconductor 38 which has its other terminal connected to the bridge circuit 32 input. In this manner, a feedback is applied at the input of the bridge circuit 32 so that the output is converted to a logarithmic function of the input current at point 78. The amplifier 34 supplies power gain sufficient to drive other equipment, such as meters, automatic controls, alarms and so forth.

Briefly, the operation is as follows. A high voltage from source 20 is applied to the outer surface of chamber 24 creating a potential gradiant from the walls of chamber 24 to electrode 26. When chamber 24 is subject to neutron bombardment, the gaseous medium is ionized resulting in current conduction to the electrode 26 and to line 40 of bridge circuit 32. This causes a bias voltage across semiconductors 44, 46 which in turn varies the capacitance of the semiconductors according to the respective semiconductor curves shown in FIGURE 2. This in turn unbalances the bridge and the high frequency alternating voltage across points 60 and 62 is impressed in an amount corresponding to the unbalance across the bridge output to amplifier 34. The signal here is greatly amplified and passed to a phase inverter 36 where the signal is reversed in sign, rectified and fed to a feedback line 37 and across diode 38. The output is available across resistor 80 and since a diode is in the feedback line through which the input current flows, the output will be in a logarithmic ratio to the input. If desired, a resistor could be substituted for diode 38 so that the output would be in linear proportion to the input.

In this description circuit 37 has been defined as a "feedback" circuit and is a feedback circuit insofar as the voltage from inverter and demodulator 36 is fed back to one terminal of diode 38. The current flow in circuit 37 is in the direction of the arrow of diode 38 and for this reason the circuit has also been referred to as a "shunt" circuit and might be referred to as a "feed around" circuit.

The level of the alternating voltage impressed between points 60 and 62 may assume various values and is below the conduction values of the semiconductors. The semiconductors act, therefore, as voltage responsive capacitors and not as conduction devices.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

Having thus described my invention, I claim:

1. Nuclear instrumentation system comprising an ionization chamber responsive to reactor neutron bombardment and emitting a direct current signal proportional thereto, a bridge circuit having two semiconductor devices connected in a common direction, an alternating current source being placed across said semiconductor devices, the voltage output of said alternating current source being less than the conduction level of said semiconductor devices, resistive means being placed across said semiconductor devices, an output contact being connected to said resistive means, bridge input means connecting said ionization chamber and a point between said semiconductor devices, with the capacitances of said semiconductor devices varying according to the amount of input voltage applied therebetween to unbalance said bridge circuit and correspondingly influence the bridge output, output blocking means being in said bridge input means, amplifying means being connected to said output contact, a phase inverter and demodulator being connected to the output of said amplifying means, and a stabilizing circuit connected from the output of said phase inverter and demodulator to the bridge input means on the input side of said output blocking means.

2. Nuclear instrumentation system comprising an ionization chamber responsive to neutron bombardment and emitting a direct current signal proportional thereto, a bridge circuit having two series connected semiconductor devices connected in a common direction, an alternating current source being placed across said semiconductor devices, the voltage output of said alternating current source being less than the conduction level of said semiconductor devices, resistive means being placed across said semiconductor devices, an output contact being connected to said resistive means, bridge input means connecting said ionization chamber and a point between said semiconductor devices, with the capacitances of said semiconductor devices varying according to the amount of input voltage applied therebetween to unbalance said bridge circuit and correspondingly influence the bridge output, output blocking means being in said bridge input means, amplifying means being connected to said output contact, a phase inverter and demodulator being connected to the output of said amplifying means, a stabilizing circuit connected from the output of said phase inverter and demodulator to the input means of said bridge circuit on the ionization chamber side of said output blocking means, diode means being in said stabilizing circuit for current flow in a direction from said input means, said output contact being adjustable along said resistive means to provide a balancing means for said bridge circuit.

3. Nuclear instrumentation system comprising an ionizing chamber responsive to neutron bombardment and emitting a direct current signal proportional thereto, a bridge circuit having two series connected semiconductor devices connected in a common direction, an alternating current source being placed across said semiconductor devices and having an operating voltage range between 100 and 200 millivolts, root mean square, resistive means being placed across said semiconductor devices, an output contact being connected to said resistive means, bridge input means connecting said ionization chamber and a point between said semiconductor devices, with the capacitances of said semiconductor devices varying according to the amount of input voltage applied therebetween to unbalance said bridge circuit and correspondingly influence the bridge output, output blocking means being in said bridge input means, amplifying means being connected to said output contact, a phase inverter and demodulator being connected to the output of said amplifying means, a feed circuit connected from the output of said phase inverter and demodulator to the input means of said bridge circuit an the ionization chamber side of said output blocking means, logarithmic conversion means being connected in said feed circuit, said alternating current source having a first portion comprising a magnetic core, primary winding and oscillator means, said primary winding being wound about said core and excited by said oscillator means, secondary windings being wound about said core and connected across said semiconductor devices, conductive shielding means comprising a conductive enclosure for shielding first portion of said alternating current source from said semiconductor devices, said resistive means and said secondary windings.

4. Nuclear instrumentation system comprising an ionizing chamber responsive to neutron bombardment and emitting a direct current signal proportional thereto, a bridge circuit having two series connected semiconductor devices connected in a common direction, an alternating current source being placed across said semiconductor devices, the voltage output of said alternating current source being less than the conduction level of said semiconductor devices, resistive means being placed across said semiconductor devices, an output contact being connected to said resistive means, bridge input means connecting said ionization chamber and a point between said semiconductor devices, with the capacitances of said semiconductor devices varying according to the amount of input voltage applied therebetween to unbalance said bridge circuit and correspondingly influence the bridge output, output blocking means being in said bridge input means, amplifying means being connected to said output contact, input blocking means being placed between said output contact and said amplifying means, a phase inverter and demodulator being connected to the output of said amplifying means, logarithmic conversion means being in a circuit connected from the output of said phase inverter and demodulator to the input means of said bridge circuit on the ionization chamber side of said output blocking means, said alternating current source having a first portion comprising a magnetic core, primary winding and oscillator means, said primary winding being wound about said core and excited by said oscillator means, secondary windings being wound about said core and connected across said semiconductor devices, conductive shielding means comprising a conductive enclosure for said semiconductive devices, said resistive means, and said secondary winding.

5. Nuclear instrumentation system comprising an ionizing chamber responsive to neutron bombardment and emitting a direct current signal proportional thereto, a bridge circuit having two series connected semiconductor devices connected in a common direction, an alternating current source being placed across said semiconductor devices, the voltage output of said alternating current source being less than the conduction level of said semiconductor devices, resistive means being placed across said semiconductor devices, an output contact being connected to said resistive means, bridge input means connecting said ionization chamber and a point between said semiconductor devices, with the capacitances of said semiconductor devices varying according to the amount of input voltage applied therebetween to unbalance said bridge circuit and correspondingly influence the bridge output, output blocking means being in said bridge input means, amplifying means being connected to said output contact, input blocking means being placed between said output contact and said amplifying means, a phase inverter and demodulator being connected to the output of said amplifying means, a feed circuit connected from the output of said phase inverter and demodulator to the input means to said bridge circuit on the ionization chamber side of said output blocking means, said alternating current source having a first portion comprising a magnetic core, primary winding and oscillator means, said primary winding being wound about said core and excited by said oscillator means, secondary windings being wound about said core and connected across said semiconductor devices, conductive shielding means comprising a conductive enclosure for said semiconductive devices, said resistive means, and said secondary winding, said conductive enclosure including an outer shielding cable for that portion of the secondary winding extending outside of said enclosure and wound about said core.

6. Nuclear instrumentation system comprising an ionizing chamber responsive to reactor neutron bombardment and emitting a direct current signal proportional thereto, a bridge circuit having two series connected semiconductor devices connected in a common direction, an alternating current source being placed across said semiconductor devices, resistive means being placed across said semiconductor devices, an output contact being connected to said resistive means, bridge input means connecting said ionization chamber and a point between said semiconductor devices, with the capacitances of said semiconductor devices varying according to the amount of input voltage applied therebetween to unbalance said bridge circuit and correspondingly influence the bridge output, output blocking means being in said bridge input means, amplifying means being connected to said output contact, input blocking means being placed between said output contact and said amplifying means, a phase inverter and demodulator being connected to the output of said amplifying means, a diode being in a circuit connected from the output of said phase inverter and demodulator to the input means to said bridge circuit on the ionization chamber side of said output blocking means, said alternating current source having a first portion comprising a magnetic core, primary winding and oscillator means, said primary winding being wound about said core and excited by said oscillator means, secondary windings being wound about said core and connected across said semiconductor devices, conductive shielding means comprising a conductive enclosure for shielding said first portion of said alternating current source from said semiconductive devices, said resistive means and said secondary windings, said alternating current source having a voltage in the range of 100–200 millivolts, root-mean-square.

7. Nuclear instrumentation system comprising an ionization chamber responsive to reactor neutron bombardment and emitting a direct current signal proportional thereto, a bridge circuit having in each of two arms thereof, a semiconductor device, said semiconductor device being connected in a common direction, said bridge circuit having two resistive arms, an alternating current source being connected along one diagonal of said bridge circuit, the voltage output of said alternating current source being less than the conduction level of said semiconductor devices, amplifying means being connected across the other diagonal of said bridge circuit, input means connecting said ionization chamber and a point between said semiconductor devices, with the capacitances of said semiconductor devices varying according to the amount of input voltage applied therebetween to unbalance said bridge circuit and correspondingly influence the bridge output, a phase inverter and demodulator being connected to the output of said amplifying means, a shunt circuit being connected from the output of said phase inverter and demodulator to the input means to said bridge circuit.

8. Nuclear instrumentation system comprising an ionization chamber responsive to reactor neutron bombardment and emitting a direct current signal proportional thereto, a bridge circuit having in each of two arms thereof a semiconductor device, said semiconductor devices being connected in a common direction, said bridge circuit having two resistive arms, an alternating current source being connected across said semiconductor devices along one diagonal of said bridge circuit, the voltage output of said alternating current source being less than the conduction level of said semiconductor devices, amplifying means being connected across the other diagonal of said bridge circuit, input means being connected to said ionization chamber and a point between said semiconductor devices, with the capacitances of said semiconductor devices varying according to the amount of input voltage applied therebetween to unbalance said bridge circuit and correspondingly influence the bridge output, a phase inverter and demodulator being connected to the output of said amplifying means, a feedback circuit connected from the output of said phase inverter to the input means of said bridge circuit, said resistive means in said bridge circuit at one of said output connections, one output connection being an adjustable contact along said resistive means to provide a balancing means for said bridge circuit.

9. Nuclear instrumentation circuit means comprising a bridge circuit having in each of two arms thereof a semiconductor device, said semiconductor devices being connected in a common direction, said bridge circuit having two resistive arms, an alternating current source being connected along one diagonal of said bridge circuit, the voltage output of said alternating current source being less than the conduction level of said semiconductor devices, amplifying means being connected across the other diagonal of said bridge circuit, input means being connected between said semiconductor devices, with the capacitances of said semiconductor devices varying according to the amount of input voltage applied therebetween to unbalance said bridge circuit and correspondingly influence the bridge output, resistive means in said bridge circuit at one of said output connections, said one output connections being an adjustable contact along said resistive means to provide a balancing means for said bridge circuit.

10. Nuclear reactor instrumentation system comprising an ionizing chamber responsive to reactor neutron bombardment and emitting a direct current signal proportional thereto, circuit means for receiving and inverting said signal to provide an amplified alternating current output, and having an operating voltage range between 100 and 200 millivolts, root mean square, said circuit means comprising a bridge circuit having two semiconductor devices connected across said semiconductor devices in a common direction, an alternating current source being placed across said semiconductor devices, resistive means being placed across said semiconductor devices, an output contact being connected to said resistive means, bridge input means being connected between said semiconductor devices, with the capacitances of said semiconductor devices varying according to the amount of input voltage applied therebetween to unbalance said bridge circuit and correspondingly influence the bridge output, output blocking means being in said bridge input means, amplifying means being connected to said output contact, input blocking means being placed between said output contact and said amplifying means, a phase inverter and demodulator being connected to the output of said amplifying means, a diode being in a feed circuit connected from the output of said phase inverter and demodulator to the input of said circuit means on the ionization chamber side of said output blocking means, said alternating current source having a first portion comprising a magnetic core, primary winding and oscillator means, said primary winding being wound about said core and excited by said oscillator means, secondary windings being wound about said core and connected across said semiconductor devices, conductive shielding means comprising a conductive enclosure for said semiconductive devices, said resistive means, and said secondary winding, said conductive enclosure including an outer shielding cable for that portion of the secondary winding extending outside of said enclosure and wound about said core, output signal impeding means being placed in said signal input means and input signal means being placed in said output.

11. Nuclear instrumentation system comprising an ionization chamber responsive to reactor neutron bombardment and emitting a direct current signal proportional thereto, a bridge circuit having two series connected voltage responsive capacitors, an alternating current source being placed across said capacitors, the voltage output of said alternating current source being less than the conduction level of said semiconductor devices, resistive means being placed across said capacitors, an output contact being connected to said resistive means, bridge input means connecting said ionization chamber and a point between said capacitors, with the capacitances of said capacitors varying according to the amount of input voltage applied therebetween to unbalance said bridge circuit and correspondingly influence the bridge output, output blocking means being in said bridge input means, amplifying means being connected to said output contact, a phase inverter and demodulator being connected to the output of said amplifying means, and a stabilizing circuit connected from the output of said phase inverter and demodulator to the bridge input means on the input side of said output blocking means.

12. Nuclear instrumentation system comprising an ionizing chamber responsive to reactor neutron bombardment and emitting a direct current signal proportional thereto, a bridge circuit having two series connected voltage responsive capacitors connected in a common direction, an alternating current source being placed across said capacitors, resistive means being placed across said capacitors, an output contact being connected to said resistive means, bridge input means connecting said ionization chamber and a point between said capacitors, with the capacitances of said capacitors varying according to the amount of input voltage applied therebetween to unbalance said bridge circuit and correspondingly influence the bridge output, output blocking means being in said bridge input means, amplifying means being connected to said output contact, input blocking means being placed between said output contact and said amplifying means, a phase inverter and demodulator being connected to the output of said amplifying means, a diode being in a circuit connected from the output of said phase inverter and demodulator to the input means to said bridge circuit on the ionization chamber side of said output blocking means, said alternating current source having a first portion comprising a magnetic core, primary winding and oscillator means, said primary winding being wound about said core and excited by said oscillator means, secondary windings being wound about said core and connected across said capacitors, conductive shielding means comprising a conductive enclosure for shielding said first portion of said alternating current source from said capacitors, said resistive means and said secondary windings, said alternating current source having a voltage in the range of 100–200 millivolts, root-mean-square.

References Cited in the file of this patent
UNITED STATES PATENTS

| | | |
|---|---|---|
| 2,088,584 | Bucky | Aug. 3, 1937 |
| 2,544,928 | Lahmeyer et al. | Mar. 13, 1951 |
| 2,564,626 | MacMahon et al. | Aug. 14, 1951 |
| 2,581,273 | Miller | Jan. 1, 1952 |
| 2,675,484 | Hepp | Apr. 13, 1954 |
| 2,681,430 | Mouzon | June 15, 1954 |
| 2,839,678 | De Witz | June 17, 1958 |
| 2,899,561 | White | Aug. 11, 1959 |
| 2,909,662 | Von Hippel et al. | Oct. 20, 1959 |
| 2,917,633 | Richards | Dec. 15, 1959 |
| 2,917,717 | Thorsen | Dec. 15, 1959 |
| 2,955,213 | Schaive | Oct. 4, 1960 |
| 2,956,234 | Olsen | Oct. 11, 1960 |

OTHER REFERENCES

Bay: "Millimicrosecond Coincidence Circuits," Nucleonics, April 1956, pages 56 to 60.